United States Patent [19]

Sherlock

[11] 3,818,096

[45] June 18, 1974

[54] COMPOSITIONS OF 1,2-DILOWER ALKYL ARYLPYRAZOLIUM QUATERNARY SALTS AND METHOD OF LOWERING BLOOD SUGAR LEVELS WITH SAME

[75] Inventor: Margaret Sherlock, Bloomfield, N.J.

[73] Assignee: Schering Corporation, Bloomfield, N.J.

[22] Filed: Apr. 12, 1972

[21] Appl. No.: 243,429

[52] U.S. Cl. ............................................. 424/273
[51] Int. Cl. .......................................... A61k 27/00
[58] Field of Search ................................... 424/273

[56] References Cited
UNITED STATES PATENTS
3,350,407  10/1967  Flecher et al. ...................... 260/310

OTHER PUBLICATIONS

Chemical Abstracts, Vol. 53, (1961), 5472.

*Primary Examiner*—Stanley J. Friedman
*Assistant Examiner*—Frederick E. Waddell
*Attorney, Agent, or Firm*—Mary S. King

[57] ABSTRACT

Pharmaceutical compositions containing a 1,2-dilower alkyl arylpyrazolium quaternary salt as active component are described, along with methods of using same. These active components exhibit hypoglycemic activity as evidenced by their ability to lower blood sugar levels.

28 Claims, No Drawings

COMPOSITIONS OF 1,2-DILOWER ALKYL ARYLPYRAZOLIUM QUATERNARY SALTS AND METHOD OF LOWERING BLOOD SUGAR LEVELS WITH SAME

BACKGROUND OF INVENTION

This invention relates to novel pharmaceutical compositions and to the method of using said compositions.

More specifically, this invention relates to novel compositions comprising a pharmaceutically acceptable carrier and a 1,2-dilower alkyl arylpyrazolium quaternary salt for use in lowering blood sugar levels in warm blooded animal subjects, and to the process of using such compositions to lower blood sugar levels in warm blooded animal subjects.

PRIOR ART

Compounds identified in the art of chemistry as 1,2-dilower alkyl pyrazolium quaternary salts are known, being described as intermediates in the preparation of other chemical compounds, e.g., as intermediates in the preparation of 1,2-dilower alkyl pyrazolines.

By my invention, I have discovered that pharmaceutical compositions comprising certain 1,2-dilower alkyl arylpyrazolium quaternary salts are useful in lowering blood sugar levels when administered via the oral route to warm blooded animal subjects.

SUMMARY OF INVENTION

The invention sought to be patented in its composition aspect resides in the concept of an orally administrable pharmaceutical composition for lowering blood sugar levels in warm blooded animal subjects comprising a pharmaceutically acceptable carrier and an effective blood sugar lowering amount of a compound selected from the group consisting of 1,2-dilower alkyl arylpyrazolium quaternary salts defined by following structural formula I:

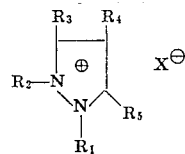

wherein each of $R_1$ and $R_2$ is a lower alkyl; each of $R_3$, $R_4$ and $R_5$ is a member selected from the group consisting of hydrogen, a hydrocarbon radical having up to 10 carbon atoms, and a hydrocarbon radical having up to 10 carbon atoms substituted by a substituent selected from the group consisting of halogen and lower alkoxy; and X is a pharmaceutically acceptable anion;

with the proviso that at least one of $R_3$, $R_4$ and $R_5$ must be phenyl or phenyl substituted by a member selected from the group consisting of halogen, lower alkyl, and lower alkoxy.

The invention sought to be patented in its process aspect resides in the concept of a process for the lowering of blood sugar levels in warm blooded animal subjects which comprises orally administering to such subjects an effective blood sugar lowering amount of a compound selected from the group consisting of a 1,2-dilower alkyl arylpyrazolium quaternary salt of above structural formula I.

The composition and process aspects of this invention are preferably carried out utilizing pharmaceutically acceptable quaternary salts of formula I wherein $R_1$ and $R_2$ are methyl and at least one of $R_3$, $R_4$ and $R_5$ is phenyl or phenyl substituted by methyl. Particularly preferred are compositions containing as active ingredient an effective blood sugar lowering amount of a 1,2-dimethyl-3-phenyl(or tolyl)-pyrazolium salt (particularly the chloride and methyl sulfate salts thereof) of formula I having at C-4 a hydrogen or methyl group, and at C-5 a hydrogen, methyl or phenyl group, and the process of orally administering said preferred compositions to warm blooded animal subjects for the lowering of blood sugar levels in said subjects.

DETAILED DESCRIPTION OF INVENTION

The active components of the compositions of this invention are 1,2-dilower alkyl arylpyrazolium quaternary salts of formula I set forth hereinabove.

The compounds of formula I exist in several resonance forms depending upon the position of the positive charge of the quaternary salts defined thereby, said positive charge being distributed between the two nitrogen atoms and the two carbon atoms in the pyrazolium ring adjacent to said nitrogen atoms.

In accordance with established practice, the compounds of this invention are depicted by structural formula I as shown hereinabove with the positive charge at the center of the structural formula and with the double bonds omitted therefrom, which formula inherently includes all the resonance forms of the compounds defined thereby, as shown hereinbelow:

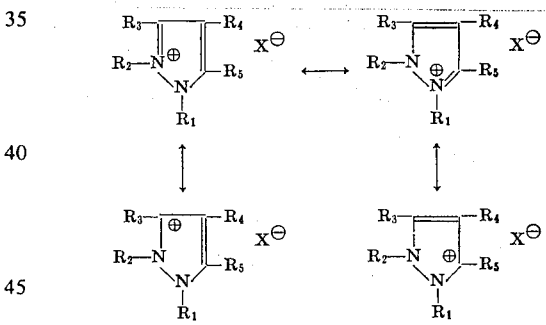

In this specification and in the claims, a compound named as a 1,2-dilower alkyl arylpyrazolium salt, e.g., 1,2,4-trimethyl-3-phenylpyrazolium chloride, is to be construed as inherently including all the resonance forms thereof. It is to be noted also, in view of the symmetry and resonance forms of the pyrazolium ion, that when $R_1$ equals $R_2$, positions three and five are equivalent; therefore, the aforenamed compound is identical with the compound named as 1,2,4-trimethyl-5-phenylpyrazolium chloride.

With reference to the active components as defined by formula I of the compositions of this invention, included within the term "lower alkyl" are hydrocarbon radicals having up to four carbon atoms including methyl, ethyl, n-propyl, iso-propyl, iso-butyl, and tert-butyl.

By the term "hydrocarbon radicals having up to 10 carbon atoms" are included alkyl radicals (both straight chain and branched) such as methyl, ethyl, isopropyl, octyl, decyl; aralkyl radicals such as benzyl; and aryl radicals such as phenyl, tolyl (o, m, and p), xylyl, 1,3,4-trimethylphenyl, and tert-butylphenyl.

Contemplated as included within the term "pharmaceutically acceptable anions" are inorganic and organic anions such as halides (e.g., chloride, bromide, iodide), lower alkanoates (e.g., acetate and propionate), phosphate, nitrate, perchlorate, sulfate, methyl sulfate, fumarate, succinate, maleate, tartrate, methanesulfonate, ethanesulfonate, p-toluenesulfonate, benzenesulfonate and the like. Among the preferred quaternary salts of this invention are those wherein the anion, X, is bromide, chloride, iodide or methyl sulfate.

By lower alkanoate is contemplated acid radicals of alkanoic acids having up to eight carbon atoms including acetic acid, propionic acid, caproic acid, valeric acid and caprylic acid.

In general, compounds embracing the various quaternary anions, if not available directly on synthesis, may be obtained by application of a suitable anion exchange method carried out according to general procedures known in the art.

Included among the active components of the compositions of the present invention are compounds of formula I wherein $R_1$ and $R_2$ are methyl such as:
1,2,3-trimethyl-4-phenylpyrazolium chloride,
1,2,3-trimethyl-4-(p-chlorophenyl)-pyrazolium fumarate,
1,2,5-trimethyl-3-phenylpyrazolium chloride,
1,2,4-trimethyl-3-phenylpyrazolium chloride,
1,2-dimethyl-4-ethyl-3-phenylpyrazolium iodide,
1,2-dimethyl-3,5-diphenylpyrazolium methyl sulfate,
1,2-dimethyl-3-phenylpyrazolium chloride,
1,2,4-trimethyl-3-(p-tolyl)-pyrazolium iodide,
1,2-dimethyl-3,4-diphenylpyrazolium iodide,
1,2-dimethyl-3-(3', 4'-dimethylphenyl)-pyrazolium chloride,
1,2,4,5-tetramethyl-3-phenylpyrazolium iodide and the like.

Of the foregoing, particularly valuable as hypoglycemic agents, as evidenced by their ability to lower blood sugar levels in warm blooded animals are the 1,2-dimethyl-3-phenyl(or 3-tolyl)-pyrazolium chlorides, iodides and methyl sulfate quaternary salts having a hydrogen or a lower alkyl group at C-4 and a hydrogen, methyl or phenyl group at C-5. Of these, 1,2,4-trimethyl-3-phenylpyrazolium chloride is a preferred active component for use in the compositions and method of this invention.

PREPARATION OF COMPOUNDS OF FORMULA I — ACTIVE COMPONENTS FOR THE COMPOSITIONS AND METHOD OF THIS INVENTION

The 1,2-dilower alkyl arylpyrazolium quaternary salts of formula I, active ingredients of the compositions of this invention can be prepared via different methods as described below, which include reactions of a 3-pyrazoline with a hydride abstractor and a source of a pharmaceutically acceptable anion (e.g., as in Procedures A, B, D and E); alkylation reactions with an N-substituted pyrazole (e.g., as in Procedures C and F); and condensation reactions with a substituted β-dicarbonyl and a dilower alkyl hydrazine dihalide (e.g., Procedure H).

Procedure A

A convenient one-step procedure for preparing 1,2-dilower alkyl-3(or 4)-phenyl(or substituted phenyl)-pyrazolium salts is by treating the corresponding 3-pyrazoline with an acid which can act as a hydride acceptor (e.g., fumaric and maleic acid) whereby is formed a quaternary pyrazolium salt having the acid anion. Thus, for example, when equimolar quantities of 1,2-dimethyl-3-phenyl-3-pyrazoline and fumaric acid are heated together in refluxing alcohol there is formed about 50 percent yield of 1,2-dimethyl-3-phenylpyrazolium fumarate as shown below:

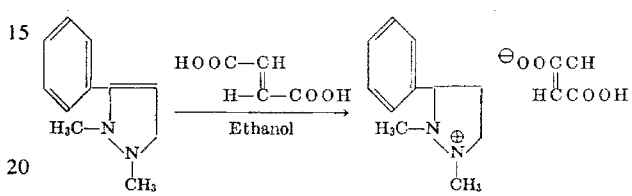

If maleic acid is employed in the aforementioned process, there is formed the corresponding maleate, e.g., 1,2-dimethyl-3-phenylpyrazolium maleate.

Procedure B

Another method of preparing 1,2-dilower alkyl-pyrazolium salts from 1,2-dilower alkyl-3-pyrazolines which provides a convenient method for preparing chloride quaternary pyrazolium salts comprises treating equimolar quantities of a 1,2-dilower alkyl-3-pyrazoline (e.g., 1,2,3-trimethyl-4-pyrazoline) and chlorotriphenylmethane in an aprotic solvent (e.g., sulfur dioxide and, preferably, acetonitrile) to obtain the corresponding pyrazolium chloride, e.g., 1,2,3-trimethyl-4-phenylpyrazolium chloride and triphenylmethane as shown in the following reaction sequence:

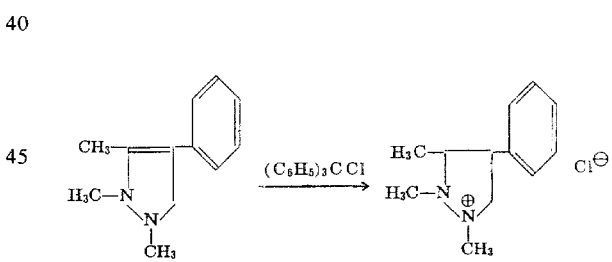

This reaction can also be carried out using other similar hydride abstractors such as triphenylmethyl fluoborate and triphenylmethyl perchlorate whereby are obtained the corresponding fluoborate and perchlorate quaternary salts, respectively. These salts are suitable for characterization of the compounds and may be converted to pharmaceutically acceptable salts by application of an appropriate anion exchange method carried out according to general procedures known in the art.

When carrying out this reaction utilizing triphenylmethyl fluoborate or triphenylmethyl perchlorate as hydride abstractors, aprotic halogenated solvents, (e.g., chloroform, carbontetrachloride and methylene chloride) may be used as well as sulfur dioxide and acetonitrile.

Alternatively, by simply refluxing a 1,2-dilower alkyl-3-pyrazoline in carbon tetrachloride, there is obtained the corresponding pyrazolium chloride.

Procedure C

The 1,2-dilower alkylpyrazolium halide quaternary salts are conveniently prepared from a 1-lower alkyl pyrazole by treatment thereof with an alkyl halide at high temperatures. Thus, for example, 1-methyl-3,4-diphenylpyrazole and methyl iodide heated together in a sealed tube at 100°C will produce 1,2-dimethyl-3,4-diphenylpyrazolium iodide as shown below:

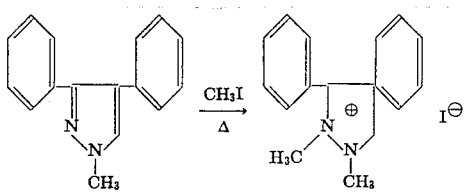

The above procedure provides a convenient method of preparaing 1,2-dilower alkylpyrazolium halides having unlike alkyl groups on each nitrogen atom. Thus, if ethyl iodide is used as reagent in the above-described process, there is formed 1-methyl-2-ethyl-3,4-diphenylpyrazolium iodide.

Bromide and chloride quaternary salts of 1,2-dilower alkylpyrazolium cations are also formed by the above process by utilizing alkyl bromides or alkyl chlorides in place of alkyl iodides.

Procedure D

Bromide quaternary salts are also prepared by treating a 1,2-dilower alkyl-3-aryl-3-pyrazoline (e.g. 1,2,4-trimethyl-3-phenyl-3-pyrazoline) with bromine in chloroform whereby is obtained the corresponding 1,2-dilower alkyl-3-aryl-pyrazolium bromide (e.g., 1,2,4-trimethyl-3-phenylpyrazolium bromide).

Procedure E

In yet another procedure, the foregoing conversion is effected by the use of N-bromosuccinimide rather than bromine. For example, 1,2,4-trimethyl-3-phenyl-3-pyrazoline in a chlorinated solvent such as chloroform or carbon tetrachloride upon treatment with N-bromosuccinimide with irradiation or in the presence of a catalytic quantity of benzoylperoxide will yield 1,2-,4-trimethyl-3-phenylpyrazolium bromide.

Procedure F

Another alkylation process is that wherein a 1-lower alkyl pyrazole (e.g., 1-methyl-3,5-diphenylpyrazole) is treated with an esterified acid as alkylating agent such as dimethyl sulfate in an inert solvent (e.g., benzene) whereby there is formed the acid anion (e.g., methyl sulfate) quaternary salt of the corresponding 1,2-dimethylpyrazolium cation (e.g., 1,2-dimethyl-3,5-diphenylpyrazolium methyl sulfate). Other esterified acid alkylating agents which may be used in this process are methyl methanesulfonate, methyl ethanesulfonate, methyl benzenesulfonate, methyl p-toluenesulfonate methyl fluorosulfonate, trimethyloxonium fluoroborate, whereby are obtained the corresponding methanesulfonate, ethanesulfonate, benzenesulfonate, toluenesulfonate, fluorosulfonate and fluoroborate quaternary salts, respectively, of the 1,2-dimethylpyrazolium cation, e.g. 1,2-dimethyl-3,5-diphenylpyrazolium.

In the above procedure, by utilizing other lower alkyl esters of the alkylating agents, e.g., diethyl sulfate, ethyl p-toluenesulfonate, and triethyloxonium fluoroborate, there are prepared the corresponding lower alkyl quaternary salts. This process thus provides a method for preparing mixed 1,2-dilower alkyl derivatives of formula I. Thus, for example, 1-methyl-3,5-diphenylpyrazole upon treatment with diethyl sulfate and ethyl p-toluenesulfonate produces 1-methyl-2-ethyl-3,5-diphenylpyrazolium ethyl sulfate and p-toluenesulfonate, respectively.

Procedure G

The 1,2-dilower alkylpyrazolium lower alkanoate (e.g., acetate, propionate) quaternary salts can be prepared from the corresponding 1,2-dilower alkyl-3-pyrozolines by treatment thereof with the mercuric salt of the desired cation, e.g., mercuric acetate and mercuric propionate, respectively, in the presence of an aqueous solution of the corresponding acid. Thus, for example, when 1,2-dimethyl-3-(p-tolyl)-3-pyrazoline is heated with four equivalents of mercuric acetate in 5 percent aqueous acetic acid for several hours, there is obtained 1,2-dimethyl-3-(p-tolyl)-pyrazolium acetate.

Procedure H

Compounds of formula I are also prepared by treating a β-dicarbonyl compound with a dilower alkyl hydrazine and an acid (preferably hydroiodic acid, hydrobromic acid, hydrochloric acid or perchloric acid), as shown hereinbelow wherein $R_1$, $R_2$, $R_3$, $R_4$, $R_5$ and X are defined as in formula I:

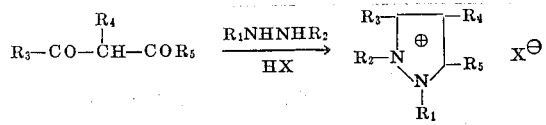

Thus, upon treatment of 1,3-diphenyl-1,3-propanedione with dimethylhydrazine and hydrogen iodide there is obtained 1,2-dimethyl-3,5-diphenylpyrazolium iodide.

In the foregoing procedure, by using other acids in place of hydroiodic acid (e.g., hydrobromic, hydrochloric, perchloric, sulfuric, phosphoric and nitric acids), there is obtained the corresponding quaternary salt (e.g., the bromide, chloride, perchlorate, sulfate, phosphate and nitrate salts, respectively).

THE PHARMACEUTICAL COMPOSITIONS OF THE INVENTION AND THEIR USE IN THE METHOD OF THE INVENTION

The pharmaceutically acceptable 1,2-dilower alkyl arylpyrazolium quaternary salts of formula I, the active components of the compositions of this invention, exhibit hypoglycemic activity in warm blooded animals which indicates them to be useful in medicaments in the lowering of blood sugar levels. When the active components (i.e., compounds of formula I) are administered orally to fasted mice ($CF_1$) which have been given alanine or to fasted guinea pigs, a reduction of blood sugar is observed. The active components of this invention in aqueous solutions or aqueous carboxymethylcellulose suspensions are administered by gavage to 24 hour fasted mice made hyperglycemic by the administration of 1-alanine, or to fasted guinea pigs.

Plasma glucose is determined either with the Technicon Autoanalyzer or fluorometrically using the Hexokinase-glucose-6-phosphate dehydrogenase coupled assay. Data is expressed as the percent change of blood glucose in an animal treated with a pyrazolium salt of this invention as compared with the average blood glucose concentration of a placebo injected group. The results show that the active components of the present invention are useful in lowering the blood glucose concentration of warm blooded animals. Thus, for example, compositions of this invention containing as active ingredient one of 1,2,4-trimethyl-3-phenylpyrazolium chloride, 1,2,5-trimethyl-3-phenylpyrazolium chloride, 1,2-dimethyl-3-phenylpyrazolium chloride, and 1,2-dimethyl-3,5-diphenylpyrazolium methyl sulfate produces about a 50 percent or greater reduction in plasma glucose in mice and in guinea pigs when administered orally at a dose of 20–30 mg./kg. A similar degree of reduction in plasma glucose in mice and guinea pigs is produced by 1,2,4-trimethyl-3-(p-tolyl)-pyrazolium iodide when administered orally at a dose of about 50 mg./kg.

The active components of this invention may be used for the lowering of blood glucose levels in warm blooded animals at an oral dose of from about 1 to about 200 mg. per kilogram of body weight per day.

Of the active components of this invention, a particularly preferred species are the chloride quaternary salts of 1,2-dimethyl-3-phenyl(or 3-tolyl)-pyrazoliums having a hydrogen or methyl group at each of C-4 and a hydrogen, methyl or phenyl group at C-5 in view of their superior ability to lower blood sugar levels in warm blooded animals. Additionally, it has been discovered that compounds of this preferred species also exhibit anti-obesity properties as evidenced by their ability to inhibit lipogenesis when administered via the oral route to male adult Charles River rats (CD strain). Thus, for example, 1,2-dimethyl-3-phenylpyrazolium chloride, 1,2,4-trimethyl-3-phenylpyrazolium chloride and 1,2-dimethyl-3,5-diphenylpyrazolium methyl sulfate inhibit lipogenesis when administered orally to male Charles River rats at a dose of about 30 mg./kg. The combination of hypoglycemic and anti-obesity properties exhibited by the preferred species of the active components of the compositions of this invention render them of particular value as hypoglycemic agents in view of the known association of obesity with hyperglycemia in warm blooded animals.

In connection with the use of the pharmaceutically acceptable 1,2-dilower alkyl arylpyrazolium quaternary salts in the process of lowering blood sugar levels in warm blooded animals, it is to be noted they are administered together with a pharmaceutically acceptable carrier to form the compositions of this invention and that such administration can be carried out in both single and multiple dosages. The active components of this invention as hypoglycemic agents can be incorporated into various pharmaceutical forms for oral administration such as tablets, capsules, pills, elixirs and so forth, for immediate or sustained release by combining the suitable carriers. The compositions of this invention may be in the form of dosage units for a single therapeutic dose or in small units for multiple dosages or in larger units for division into single doses. The daily dosage in warm blooded animals via the oral route usually ranges from about 1 mg. to about 200 mg. per kilogram body weight. Obviously, in addition to the active compounds of formula I, the compositions of this invention are comprised also of a pharmaceutically acceptable carrier including excipients, binders, fillers and other therapeutically inert ingredients necessary in the formulation of the pharmaceutical compositions of this invention.

Preferred for use as active components in the compositions and process of this invention are compounds of formula I wherein $R_1$ and $R_2$ are methyl and $R_3$ is phenyl or tolyl, and particularly those wherein $R_4$ and $R_5$ are hydrogen or lower alkyl, e.g., methyl. Of particular value are the chloride quaternary salts of formula I (i.e., compounds wherein X is chloride).

It is understood that included within the scope of this invention are compositions having hypoglycemic activity which contain a compound of formula I wherein one or more of substituents $R_1$, $R_2$, $R_3$, $R_4$ or $R_5$ are different from but, to one skilled in the art, obvious equivalents of the substituents as specifically described herein. For example, a composition having hypoglycemic activity comprising a compound of formula I wherein a substituent $R_3$, $R_4$ or $R_5$ is a hydrocarbon having up to 12 carbon atoms (e.g., wherein $R_3$ is cyclohexylphenyl) is considered equivalent to the compositions specifically described herein, and as being included within the scope of the claimed invention.

The examples which follow serve to illustrate the invention, but the invention is not to be construed as limited in scope thereby.

PROCEDURE 1

1,2-Dimethyl-3-substituted-3-pyrazolines

A. 1,2,4-Trimethyl-3-phenyl-3-pyrazoline

To 300 ml. absolute ethanol add 0.3 mole propiophenone (40 g.), 0.3 mole dimethylhydrazine dihydrochloride (40 g.), 0.54 moles paraformaldehyde (16.2 g.) and 1 ml. concentrated hydrochloric acid, and heat at reflux temperature for 5 hours. Neutralize with aqueous sodium hydroxide, then concentrate the solution to a residue comprising 1,2,4-trimethyl-3-phenyl-3-pyrazoline. Purify by distillation, b.p. = 80°–90°C/1.5 mm. Hg.

In the above procedure, by using other 1,2-dialkyl-hydrazines such as 1,2-diethylhydrazine or 1,2-di-(n-propyl)-hydrazine instead of 1,2-dimethylhydrazine, there is obtained the corresponding 1,2-diethyl or 1,2-di-(n-propyl) derivative, i.e., 1,2-diethyl-3-phenyl-4-methyl-3-pyrazoline or 1,2-di-(n-propyl)-3-phenyl-4-methyl-3-pyrazoline, respectively.

B. Essentially follow the procedure described in above Procedure A to prepare the compounds listed below using in each case the appropriate ketone, together with dimethylhydrazine, dihydrochloride, paraformaldehyde, and small quantities of concentrated hydrochloric acid:

1,2-dimethyl-3-phenyl-3-pyrazoline, b.p. = 88°–92°C/2 mm. Hg., 1,2-dimethyl-3-(p-tolyl)-3-pyrazoline, b.p. = 100–105°C/20 mm. Hg. (m.p. = 60°C), 1,2-dimethyl-3-(p-chlorophenyl)-3-pyrazoline, b.p. = 100°–105°C/20 mm. Hg. (m.p. = 18°–20°C), 1,2-dimethyl-3-(p-fluorophenyl)-3-pyrazoline, b.p. = 80°–90°C/0.1 mm. Hg., 1,2-dimethyl-3-(p-bromophenyl)-3-pyrazoline, b.p. = 105°C/0.1 mm. Hg. (m.p. = 30°C (hexane) ), 1,2-dimethyl-3-(p-methoxyphenyl)-3-pyrazoline, b.p. = 110°–120°C/0.01 mm. Hg., 1,2-dimethyl-3-(2', 4'-dimethylphenyl)-3-pyrazoline, b.p. = 105°–110°C/20 mm. Hg., 1,2-dimethyl-3-(3',4'-dimethylphenyl)-3-pyrazoline, b.p. = 110°–115°C/20 mm. Hg., 1,2-dimethyl-3-(m-tolyl)-3-pyrazoline, b.p. = 90°–95°C/15 mm. Hg., 1,2-dimethyl-3-(o-tolyl)-3-pyrazoline, b.p. = 90°–95°C/15 mm. Hg., and 1,2-dimethyl-3-(m-fluorophenyl)-3-pyrazoline, b.p. = 100°–105°C/20 mm. Hg.

PROCEDURE 2

1,2-Dimethyl-3-substituted-3-pyrazolines

Alternatively, the 1,2-dimethyl-3-substituted-3-pyrazoline compounds can be prepared according to the following procedures by treating the appropriate Mannich base with dimethylhydrazine in ethanol.

A. 1,2-Dimethyl-3-phenyl-3-pyrazoline

To 90 ml. of absolute ethanol add 0.1 mole of β-dimethylaminopropiophenone (Mannich base prepared by reaction of acetophenone, formaldehyde and dimethylamide) and 0.1 mole of 1,2-dimethylhydrazine. Heat the reaction mixture at reflux temperature for 12 hours, then evaporate the solvent in vacuo to a residue comprising 1,2-dimethyl-3-phenyl-3-pyrazoline. Purify by distillation, b.p. = 115°–120°C/20 mm. Hg. (yield = 11–12 g.).

B. 1,2,3-Trimethyl-4-phenyl-3-pyrazoline and 1,2,3-trimethyl-4-(p-chlorophenyl)-3-pyrazoline Prepare the Mannich base of methyl benzyl ketone according to known procedures by reaction thereof with formaldehyde and dimethylamine hydrochloride in ethanol.

Prepare a solution of 0.1 mole of the Mannich base of methyl benzyl ketone and 0.1 mole of 1,2-dimethylhydrazine in 100 ml. of absolute ethanol. Heat the solution at reflux temperature for 12 hours and evaporate the solvent in vacuo to a residue comprising 1,2,3-trimethyl-4-phenyl-3-pyrazoline. Purify by distillation, b.p. = 103°–110°C/2.0 mm. Hg. Purify further by recrystallization from hexane, m.p. = 48°–50°C.

In a manner similar to that described hereinabove, prepare the Mannich base of methyl p-chlorobenzyl ketone and treat it with an equimolar quantity of dimethylhydrazine in absolute ethanol. Isolate and purify the resultant product in a manner similar to that to obtain 1,2,3-trimethyl-4-(p-chloro-phenyl)-3-pyrazoline, b.p. = 155°C/8.0 mm. Hg. which can be further purified by crystallization from petroleum ether, m.p. = 75°–76°C.

PROCEDURE 3

1,2-Dimethyl-3-phenyl-5-substituted-3-pyrazolines

A. 1,2,5-Trimethyl-3-phenyl-3-pyrazoline
Method I

Prepare a solution of 0.1 mole of phenyl propenyl ketone, 0.1 mole of 1,2-dimethylhydrazine dihydrochloride and a few drops of hydrochloric acid in 100 ml. of absolute ethanol. Heat the solution for three hours at reflux temperature, distill the solvent in vacuo and make the resultant residue alkaline by adding dilute aqueous sodium carbonate in the cold. Extract the aqueous mixture with ether, combine the ether extract, evaporate the ethereal solution to a residue comprising 1,2,5-trimethyl-3-phenyl-3-pyrazoline. Purify by distillation, b.p. = 120°–130°C/20 mm. Hg. (yield = 5–6 g.).

Method II

Prepare a solution of 0.1 mole of phenyl propenyl ketone, 0.1 mole of 1,2-dimethylhydrazine and a catalytic quantity of p-toluenesulfonic acid in 100 ml. of absolute ethanol. Heat the solution at reflux temperature for 12 hours, then evaporate the solvent in vacuo and distill the residue to obtain 9.92 g. of 1,2,5-trimethyl-3-phenyl-3-pyrazoline, b.p. = 120°–130°C/20 mm. Hg.

B. 1,2-Dimethyl-3,5-diphenyl-3-pyrazoline

In a manner similar to that described in Procedure 3, Method II, treat chalcone with an equimolar quantity of 1,2-dimethylhydrazine in absolute ethanol in the presence of a catalytic quantity of p-toluenesulfonic acid. Isolate and purify the resultant produce in a manner similar to that described above to obtain 1,2-dimethyl-3,5-diphenyl-3-pyrazoline, b.p. = 160°–165°C/0.05 mm. Hg.

EXAMPLE 1

1,2-Dimethyl-3-phenylpyrazolium Fumarate

To 350 ml. of 1,2-dimethyl-3-phenyl-3-pyrazoline in 3 ml. of ethanol, add a solution of 232 mg. of fumaric acid in 7 ml. of ethanol. Dilute the solution with anhydrous ethyl ether and allow the solution to stand at about 5°C for 24 hours. Filter and dry the resultant precipitate comprising 1,2-dimethyl-3-phenylpyrazolium fumarate: m.p. = 162°–167°C; yield = 289 mg.

EXAMPLE 2

1,2,3-Trimethyl-4-phenylpyrazolium Fumarate

Dissolve 1.9 g. of 1,2,3-trimethyl-4-phenyl-3-pyrazoline in 5 ml. of ethanol and add 1.16 g. of fumaric acid in 35 ml. of ethanol. Dilute the solution with ethyl ether to a volume of about 100 ml. and allow the solution to remain at about 5°C for 24 hours. Filter and dry the resultant precipitate comprising 1,2,3-trimethyl-4-phenylpyrazolium fumarate; m.p. = 198°–200°C; yield = 1.406 g.

EXAMPLE 3

1,2,3-Trimethyl-4-(p-chlorophenyl)-pyrazolium Fumarate

Dissolve 2.14 g. of 1,2,3-trimethyl-4-(p-chlorophenyl)-3-pyrazoline in ethanol and add 1.116 g. of fumaric acid in 35 ml. of ethanol. Dilute the solution with ether to a volume of about 100°C and allow the solution to stand at about 5°C for 24 hours. Filter and dry the resultant precipitate comprising 1,2,3-trimethyl-4-(p-chlorophenyl)-pyrazolium fumarate; m.p. = 156°–173°C. Purify further by recrystallizing from ethanol-ether to obtain 1,2,3-trimethyl-4-(p-chlorophenyl)-pyrazolium fumarate; m.p. = 191°–192°C (sinters 190°C); yield = 1.4 g.

EXAMPLE 4

1,2,5-Trimethyl-3-phenylpyrazolium Bromide Hemihydrate

Cool to 10°C a solution of 27.0 g. of 1,2,5-trimethyl-3-phenylpyrazoline in 250 ml. of chloroform. Slowly add a solution of 23 g. of bromine in 125 ml. of chloroform while maintaining the reaction temperature at 10°C or below. After the addition of bromine is complete, evaporate the chloroform in a stream of nitrogen maintaining the solution at 40°C. Crystallize the resultant residue from ethanol-ether to obtain 1,2,5-trimethyl-3-phenylpyrazolium bromide hemihydrate; m.p. = 184°–186°C; yield = 25.9 g.

Alternatively, by treating 1,2,3-trimethyl-5-phenylpyrazoline with bromine in the above manner, there is obtained 1,2,5-trimethyl-3-phenylpyrazolium bromide hemihydrate (identical to 1,2,3-trimethyl-5-phenylpyrazolium bromide hemihydrate).

EXAMPLE 5

1,2,5-Trimethyl-3-phenylpyrazolium Chloride

To 25 g. of 1,2,5-trimethyl-3-phenylpyrazolium bromide hemihydrate in 500 ml. of ethanol, add 40.5 g. of silver chloride. Heat the reaction mixture at reflux temperature for 4.5 hours, then cool and filter the reaction mixture. Concentrate the filtrate to a residue, add ether and separate by filtration the resultant precipitate comprising 1,2,5-trimethyl-3-phenylpyrazolium chloride. Purify by recrystallization three times from ethanol-ether. Dry at 120°C in vacuo for 24 hours to obtain 14.8 g. of 1,2,5-trimethyl-3-phenylpyrazolium chloride; m.p. = 198°–199°C. (This compound is hygroscopic.)

EXAMPLE 6

1,2,4-Trimethyl-3-phenylpyrazolium Chloride Monohydrate

Dissolve 5 g. (0.0265 moles) of 1,2,4-trimethyl-3-phenyl-3-pyrazoline in 35 ml. dry acetonitrile. Cool to 10°C and add 7.5 g. (0.0265 moles) chlorotriphenylmethane keeping the temperature of the reaction mixture below 20°C. Stir at room temperature around 18 hours, then filter the resultant precipitate comprising 1,2,4-trimethyl-3-phenylpyrazolium chloride; m.p. = 140°–142°C; yield = 2.5 g. Purify by recrystallization from acetonitrile, then dry in vacuo at about 78°C to obtain 1.85 g. of 1,2,4-trimethyl-3-phenylpyrazolium chloride monohydrate; m.p. = 139°–142°C.

In a similar manner, treat each of 1,2-diethyl-4-methyl-3-phenyl-3-pyrazoline, 1,2-di-(n-propyl)-4-methyl-3-phenyl-3-pyrazoline, and 1,2-di-(n-butyl)-4-methyl-3-phenyl-3-pyrazoline in acetonitrile with chlorotriphenylmethane to obtain 1,2-diethyl-4-methyl-3-phenylpyrazolium chloride, 1,2-di-(n-propyl)-4-methyl-3-phenylpyrazolium chloride, and 1,2-di(n-butyl)-4-methyl-3-phenylpyrazolium chloride, respectively.

EXAMPLE 7

1,2-Dimethyl-3,5-diphenylpyrazolium Methyl Sulfate

A. 1-Methyl-3,5-diphenylpyrazole

To 250 ml. of benzene, add 22 g. of 1,3-diphenyl-1,3-propanedione and 15 g. of methylhydrazine. Heat the reaction mixture at reflux temperature for 5 hours, eliminating the water from the reaction mixture by means of a Dean Stark trap. Evaporate the solvent in vacuo and dissolve the resultant residue in ether, then add dropwise an ethanolic solution of hydrogen chloride until no further precipitation occurs. Separate by filtration the resultant precipitate comprising 1-methyl-3,5-diphenylpyrazole hydrochloride; yield = 27 g.; m.p. = 170°–174°C.

Dissolve the 1-methyl-3,5-diphenylpyrazole hydrochloride in water and then bring the solution to neutrality by adding aqueous sodium hydroxide dropwise. Extract the solution with ether, then distill the combined extracts to a residue comprising 1-methyl-3,5-diphenylpyrazole. Purify by crystallization from ether-hexane; yield = 14.3 g.; m.p. = 57°–58°C.

B. 1,2-Dimethyl-3,5-diphenylpyrazolium Methyl Sulfate

Add 3.1 g. of dimethyl sulfate to a solution of 4.7 g. of 1-methyl-3,5-diphenylpyrazole and dissolve in 150 ml. of benzene. Boil the reaction mixture in an open flask until all the solvent has evaporated. Triturate the resultant residue with ether and filter the resultant precipitate comprising 1,2-dimethyl-3,5-diphenylpyrazolium methyl sulfate; yield = 7.2 g.

Purify by recrystallization; m.p. = 142°–146°C; yield = 5.8 g.

EXAMPLE 8

1,2-Dimethyl-3-phenylpyrazolium Chloride

To a stirred suspension of 50.4 g. triphenylchloromethane in 200 ml. of dry acetonitrile cooled to about 25°C, add a solution of 31.4 g. of 1,2-dimethyl-3-phenyl-3-pyrazoline in 60 ml. of dry acetonitrile. An exothermic reaction takes place with the reaction mixture temperature rising to about 50°C. Immediately cool the reaction mixture to 25°C, then stir at room temperature for about 18 hours. Separate by filtration the resultant precipitate comprising 1,2-dimethyl-3-phenylpyrazolium chloride; m.p. = 190°–192°C (dec.); yield = 27 g.

Purify by recrystallization from acetonitrile; m.p. = 190°–192°C; yield = 21.4 g.

In similar manner, treat each of the following with triphenylchloromethane in dry acetonitrile:
1,2,5-trimethyl-3-phenyl-3-pyrazoline,
1,2-dimethyl-3,5-diphenyl-3-pyrazoline,
1,2-dimethyl-3-(p-tolyl)-3-pyrazoline,
1,2-dimethyl-3-(p-chlorophenyl)-3-pyrazoline,
1,2-dimethyl-3-(p-fluorophenyl)-3-pyrazoline,
1,2-dimethyl-3-(p-bromophenyl)-3-pyrazoline,
1,2-dimethyl-3-(p-methoxyphenyl)-3-pyrazoline,
1,2-dimethyl-3-(2',4'-dimethylphenyl)-3-pyrazoline,
1,2-dimethyl-3-(3',4'-dimethylphenyl)-3-pyrazoline,
1,2-dimethyl-3-(m-tolyl)-3-pyrazoline,
1,2-dimethyl-3-(o-tolyl)-3-pyrazoline, and
1,2-dimethyl-3-(m-fluorophenyl)-3-pyrazoline.

Isolate and purify the resultant products in a manner similar to that described to obtain, respectively:
1,2,5-trimethyl-3-phenylpyrazolium chloride,
1,2-dimethyl-3,5-diphenylpyrazolium chloride,
1,2-dimethyl-3-(p-tolyl)-pyrazolium chloride,
1,2-dimethyl-3-(p-chlorophenyl)-pyrazolium chloride, 1,2-dimethyl-3-(p-fluorophenyl)-pyrazolium chloride,
1,2-dimethyl-3-(p-bromophenyl)-pyrazolium chloride, 1,2-dimethyl-3-(p-methoxyphenyl)-pyrazolium chloride,
1,2-dimethyl-3-(2',4'-dimethylphenyl)-pyrazolium chloride,
1,2-dimethyl-3-(3',4'-dimethylphenyl)-pyrazolium chloride,
1,2-dimethyl-3-(m-tolyl)-pyrazolium chloride,
1,2-dimethyl-3-(o-tolyl)-pyrazolium chloride, and
1,2-dimethyl-3-(m-fluorophenyl)-pyrazolium chloride.

EXAMPLE 9

1,2,3-Trimethyl-4-phenylpyrazolium Chloride Hemihydrate

Cool to 15°C a solution of 5 g. of 1,2,3-trimethyl-4-phenyl-3-pyrazoline in 50 ml. dry acetonitrile. Add 7.5 g. of chlorotriphenylmethane keeping the temperature of the reaction mixture below 15°C. After an initial exothermic reaction, internal temperature rises to about 20°–23°C. Cool the reaction mixture, then continue to stir the reaction mixture at room temperature for about 18 hours. Separate the resultant precipitate by filtration and wash the precipitate with ether and air dry to obtain a precipitate comprising 1,2,3-trimethyl-4-phenylpyrazolium chloride, m.p. = 120°–150°C; yield = 5 g.

Purify by triturating with ether and twice recrystallizing the resultant precipitate from acetonitrile to obtain 1,2,3-trimethyl-4-phenylpyrazolium chloride hemihydrate; m.p. = 155°–157°C (sinters 128°C).

Similarly, treat 1,2,3-trimethyl-4-(p-chlorophenyl)-3-pyrazoline with chlorotriphenylmethane in acetonitrile to obtain 1,2,3-trimethyl-4-(p-chlorophenyl)-pyrazolium chloride.

EXAMPLE 10

1,2-Dimethyl-3-(and/or 4)-arylpyrazolium Iodides

A. 1,2-Dimethyl-3,4-diphenylpyrazolium Iodide

To 1 mole of 1-methyl-3,4-diphenylpyrazole, add 1.2 moles of methyl iodide and heat the mixture in a sealed tube at 100°C for 10–15 hours. Dissolve the resultant product in anhydrous alcohol and add anhydrous ether. Separate by filtration the resultant precipitate comprising 1,2-dimethyl-3,4-diphenyl-pyrazolium iodide; m.p. = 200°–203°C.

In the above procedure by substituting for methyl iodide other lower alkyl iodides, e.g., ethyl iodide, n-propyl iodide and n-butyl iodide, there is obtained the corresponding 1-methyl-2-lower alkyl-pyrazolium salt, e.g., 1-methyl-2-ethyl-3,4-diphenylpyrazolium iodide, 1-methyl-2-(n-propyl)-3,4-di-phenylpyrazolium iodide, and 1-methyl-2-(n-butyl)-3,4-diphenyl-pyrazolium iodide, respectively.

B. In a manner similar to that described in Example 10-A, heat the following 1-methylpyrazoles in a sealed tube with an excess of methyl iodide:
1-methyl-3-phenylpyrazole,
1,4-dimethyl-3-phenylpyrazole,
1,4-dimethyl-3-(p-tolyl)-pyrazole,
1,5-dimethyl-3-phenylpyrazole,
1-methyl-4-phenylpyrazole,
1-methyl-3,5-diphenylpyrazole,
1,3-dimethyl-4-phenylpyrazole, and
1,4,5-trimethyl-3-phenylpyrazole.

Isolate and purify the resultant respective products produced in a manner similar to that described in Example 10-A hereinabove to obtain, respectively:
1,2-dimethyl-3-phenylpyrazolium iodide, m.p. = 155°C,
1,2,4-trimethyl-3-phenylpyrazolium iodide, m.p. = 217°–218°C,
1,2,4-trimethyl-3-(p-tolyl)-pyrazolium iodide, m.p. = 180°–183° C,
1,2,5-trimethyl-3-phenylpyrazolium iodide, m.p. = 187°–188°C,
1,2-dimethyl-4-phenylpyrazolium iodide, m.p. = 210°C,
1,2-dimethyl-3,5-diphenylpyrazolium iodide, m.p. = 163°–166°C,
1,2,3-trimethyl-4-phenylpyrazolium iodide, m.p. = 136°–138°C, and
1,2,4,5-tetramethyl-3-phenylpyrazolium iodide.

EXAMPLE 11

1,2-Dimethyl-3,5-diphenylpyrazolium Perchlorate

Dissolve equimolar quantities of dimethylhydrazine and 1,3-diphenyl-1,3-propanedione in anhydrous alcohol and add an excess of 70 percent aqueous perchloric acid. Heat the solution at reflux temperature for several hours, then evaporate the solution in vacuo to a residue comprising 1,2-dimethyl-3,5-di-phenylpyrazolium perchlorate. Purify by recrystallizing from ethanol-ether several times.

In the above procedure by using other acids in place of perchloric acid, e.g., hydrochloric, hydrobromic and hydroiodic acids, there is obtained the corresponding chloride, bromide and iodide salts, respectively, e.g., 1,2-dimethyl-3,5-diphenyl-pyrazolium chloride, 1,2-dimethyl-3,5-diphenylpyrazolium bromide and 1,2-dimethyl-3,5-diphenylpyrazolium iodide.

EXAMPLE 12

1,2-Dimethyl-3-benzyl-4-phenylpyrazolium Iodide

Dissolve equimolar quantities of dimethylhydrazine and the hydroxymethylene derivative of 1,3-diphenyl-2-propanone in ethanol and add a slight excess of hydroiodic acid. Heat at reflux temperature for about 12 hours, then evaporate the solution in vacuo to a residue comprising 1,2-dimethyl-1,3-benzyl-4-phenylpyrazolium iodide; purify by recrystallizing from ethanol; m.p. = 192°–195°C.

EXAMPLE 13

1,2-Dimethyl-4-ethyl-3-phenylpyrazolium Iodide

In a manner similar to that described in Example 12, treat equimolar quantities of dimethylhydrazine and the hydroxymethylene derivative of butyrophenone in ethanol with a slight excess of hydroiodic acid. Heat the reaction mixture at reflux temperature for about 12 hours, then evaporate the solution in vacuo to a residue comprising 1,2-dimethyl-4-ethyl-3-phenylpyrazolium iodide. Purify by recrystallization from ethanol; m.p. = 135°–140°C.

EXAMPLE 14

Preparation of Hard-Shell Capsule Containing 1,2,4-Trimethyl-3-(p-tolyl)-pyrazolium Iodide

| Capsule Formula | mg/Capsule |
| --- | --- |
| 1,2,4-Trimethyl-3-(p-tolyl)-pyrazolium iodide | 20.0 |
| Lactose, Hydrous, U.S.P. | 204.5 |
| Magnesium Stearate, U.S.P. | 0.5 |
| | 225.0 |

Blend and mill the 1,2,4-trimethyl-3-(p-tolyl)-pyrazolium iodide and lactose; add the magnesium stearate; mix; and fill into hard gelatin capsules.

EXAMPLE 15

Preparation of Tablet Composition Containing 1,2,4-Trimethyl-1,3-phenylpyrazolium Chloride

| Tablet Formula | mg/Tablet |
|---|---|
| 1,2,4-Trimethyl-3-phenyl-pyrazolium chloride | 50.00 |
| Monocalcium Phosphate, U.S.P. | 31.00 |
| Lactose, U.S.P. | 100.00 |
| Polyvinylpyrrolidone | 8.00 |
| Corn Starch, Food Grade (Dried) | 18.00 |
| Silicon Dioxide | 2.00 |
| Magnesium Stearate | 1.00 |
| | 210.00 |

Blend the 1,2,4-trimethyl-3-phenylpyrazolium chloride with the monocalcium phosphate and lactose, granulate the blend using a solution of polyvinylpyrrolidone, dry, reduce to granules of suitable size; add the corn starch, silicon dioxide and magnesium stearate; mix; and compress into tablets.

EXAMPLE 16

Preparation of Tablet Composition Containing 1,2-Dimethyl-3-phenylpyrazolium Chloride

| Tablet Formula | mg/Tablet |
|---|---|
| 1,2,-Dimethyl-3-phenyl-pyrazolium chloride | 100.00 |
| Confectioners Sugar, Food Grade | 123.00 |
| Polyvinylpyrrolidone | 10.00 |
| Corn Starch, Food Grade (Dried) | 13.00 |
| Silicon Dioxide | 2.00 |
| Magnesium Stearate, U.S.P. | 2.00 |
| | 250.00 |

Prepare a damp mass consisting of the 1,2-dimethyl-3-phenylpyrazolium chloride, confectionery sugar and polyvinyl-pyrrolidine; dry; reduce to granules; add the corn starch, silicon dioxide and magnesium stearate; mix; and compress into tablets.

EXAMPLE 17

Preparation of Tablet Composition Containing 1,2-Dimethyl-3,5-diphenylpyrazoline Methyl Sulfate

| Tablet Formula | mg/Tablet |
|---|---|
| 1,2,-Dimethyl-3,5-diphenyl-pyrazolium methyl sulfate | 350.00 |
| Calcium Sulfate, Dihydrate, U.S.P. | 110.00 |
| Pregelatinized Corn Starch, Food Grade | 15.00 |
| Starch (Corn or Potato), Food Grade | 52.50 |
| Magnesium Stearate, U.S.P. | 2.50 |
| | 531.00 |

Prepare a damp mass consisting of 1,2-dimethyl-3,5-diphenylpyrazolium methyl sulfate, calcium sulfate and pregelatinized corn starch; dry; reduce to granules; add the corn starch (or potato) and magnesium stearate; mix; and compress into tablets.

I claim:

1. An orally administrable composition for the lowering of blood sugar levels in warm blooded animal subjects suffering from hyperglycemia comprising a pharmaceutically acceptable carrier and an effective blood sugar lowering amount of a 1,2-dilower alkyl arylpyrazolium quaternary salt of the following formula:

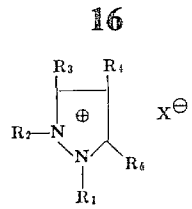

wherein each of $R_1$ and $R_2$ is lower alkyl of one to four carbon atoms; each of $R_3$, $R_4$ and $R_5$ is a member selected from the group consisting of hydrogen, alkyl having up to 10 carbon atoms, benzyl, phenyl, phenyl substituted by alkyl having one to four carbon atoms, and phenyl substituted by halogen or methoxy; and X is a pharmaceutically acceptable anion;

with the proviso that at least one of $R_3$, $R_4$ and $R_5$ must be phenyl or phenyl substituted by a member selected from the group consisting of halogen, lower alkyl and methoxy.

2. The composition of claim 1 wherein $R_1$ and $R_2$ are each methyl.

3. The composition of claim 1 wherein $R_1$ and $R_2$ are each methyl and X is a pharmaceutically acceptable halide.

4. The composition of claim 1 wherein $R_1$ and $R_2$ are each methyl and $R_3$ is a member selected from the group consisting of phenyl and phenyl substituted by methyl.

5. The composition of claim 1 wherein $R_1$ and $R_2$ are each methyl, $R_3$ is a member selected from the group consisting of phenyl and phenyl substituted by methyl, $R_4$ is a member selected from the group consisting of hydrogen and lower alkyl and $R_5$ is a member selected from the group consisting of hydrogen, phenyl and methyl.

6. The composition of claim 1 wherein $R_1$ and $R_2$ are each methyl, $R_3$ is a member selected from the group consisting of phenyl and phenyl substituted by methyl, $R_4$ is a member selected from the group consisting of hydrogen, methyl and ethyl, $R_5$ is a member selected from the group consisting of hydrogen, phenyl and methyl and X is a pharmaceutically acceptable halide.

7. The composition of claim 1 wherein $R_1$, $R_2$ and $R_5$ are each methyl, $R_3$ is phenyl, $R_4$ is hydrogen and X is chloride.

8. The composition of claim 1 wherein $R_1$, $R_2$ and $R_4$ are methyl, $R_3$ is phenyl, $R_5$ is hydrogen and X is chloride.

9. The composition of claim 1 wherein $R_1$ and $R_2$ are each methyl, $R_3$ and $R_5$ are each phenyl, $R_4$ is hydrogen and X is methyl sulfate.

10. The composition of claim 1 wherein $R_1$ and $R_2$ are each methyl, $R_3$ is phenyl, $R_4$ and $R_5$ are each hydrogen and X is chloride.

11. The composition of claim 1 wherein $R_1$ and $R_2$ are each methyl, $R_3$ is p-tolyl, $R_4$ is methyl, $R_5$ is hydrogen and X is iodide.

12. The composition of claim 1 wherein $R_1$, $R_2$ and $R_3$ are each methyl, $R_4$ is phenyl, $R_5$ is hydrogen and X is chloride.

13. The composition of claim 1 wherein $R_1$, $R_2$, $R_4$ and $R_5$ are each methyl, $R_3$ is phenyl and X is iodide.

14. The composition of claim 1 wherein $R_1$ and $R_2$ are each methyl, $R_4$ is ethyl, $R_3$ is phenyl and X is iodide.

15. A process for lowering of blood sugar levels in warm blooded animal subjects suffering from hyperglycemia which comprises orally administering to such subjects an effective blood sugar lowering amount of a compound selected from the group consisting of a 1,2-dilower alkyl arlypyrazolium quaternary salt of the following formula:

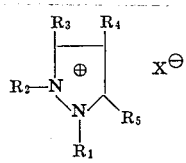

wherein each of $R_1$ and $R_2$ is lower alkyl of one to four carbon atoms; each of $R_3$, $R_4$ and $R_5$ is a member selected from the group consisting of hydrogen, alkyl having up to 10 carbon atoms, benzyl, phenyl, phenyl substituted by alkyl having one to four carbon atoms, and phenyl substituted by halogen or methoxy; and X is a pharmaceutically acceptable anion;
with the proviso that at least one of $R_3$, $R_4$ and $R_5$ must be phenyl or phenyl substituted by a member selected from the group consisting of halogen, lower alkyl and methoxy.

16. The process of claim 15 wherein $R_1$ and $R_2$ are each methyl.

17. The process of claim 15 wherein $R_1$ and $R_2$ are each methyl and X is a pharmaceutically acceptable halide.

18. The process of claim 15 wherein $R_1$ and $R_2$ are each methyl, and $R_5$ is a member selected from the group consisting of phenyl and phenyl substituted by methyl.

19. The process of claim 15 wherein $R_1$ and $R_2$ are each methyl, $R_3$ is a member selected from the group consisting of phenyl and phenyl substituted by methyl, $R_4$ is a member selected from the group consisting of hydrogen and lower alkyl and $R_5$ is a member selected from the group consisting of hydrogen, methyl and phenyl.

20. The process of claim 15 wherein $R_1$ and $R_2$ are each methyl, $R_3$ is a member selected from the group consisting of phenyl and phenyl substituted by methyl, $R_4$ is a member selected from the group consisting of hydrogen, methyl and ethyl, $R_5$ is a member selected from the group consisting of hydrogen, methyl and phenyl and X is a pharmaceutically acceptable halide.

21. The process of claim 15 wherein $R_1$, $R_2$ and $R_5$ are each methyl, $R_3$ is phenyl, $R_4$ is hydrogen and X is chloride.

22. The process of claim 15 wherein $R_1$, $R_2$ and $R_4$ are methyl, $R_3$ is phenyl, $R_5$ is hydrogen and X is chloride.

23. The process of claim 15 wherein $R_1$ and $R_2$ are each methyl, $R_3$ and $R_5$ are each phenyl, $R_4$ is hydrogen and X is methyl sulfate.

24. The process of claim 15 wherein $R_1$ and $R_2$ are each methyl, $R_3$ is phenyl, $R_4$ and $R_5$ are hydrogen and X is chloride.

25. The process of claim 15 wherein $R_1$, $R_2$ and $R_4$ are each methyl, $R_3$ is p-tolyl, $R_5$ is hydrogen and X is iodide.

26. The process of claim 15 wherein $R_1$, $R_2$ and $R_3$ are each methyl, $R_4$ is phenyl, $R_5$ is hydrogen and X is chloride.

27. The process of claim 15 wherein $R_1$, $R_2$, $R_4$ and $R_5$ are each methyl, $R_3$ is phenyl and X is iodide.

28. The process of claim 15 wherein $R_1$ and $R_2$ are each methyl, $R_4$ is ethyl, $R_3$ is phenyl and X is iodide.

* * * * *

UNITED STATES PATENT OFFICE
CERTIFICATE OF CORRECTION

PATENT NO. : 3,818,096
DATED : June 18, 1974
INVENTOR(S) : Margaret H. Sherlock

It is certified that error appears in the above-identified patent and that said Letters Patent are hereby corrected as shown below:

Page 1, inventor name, "Margaret Sherlock" should read --Margaret H. Sherlock--. Column 1, line 45, under Formula I should read --I--. Column 4, line 8, "furmaric acid" should read --fumaric acid--. Column 5, line 24, "preparaing 1,2-" should read --preparing 1,2---. Column 6, line 16, "pyrozolines by" should read --pyrazolines by--.
Column 10, line 16, "resultant produce" should read --resultant product--. Column 10, line 23, "350 ml. of" should read --350 mg. of--. Column 14, line 36, "1,2-dimethyl-1,3-benzyl" should read --1,2-dimethyl-3-benzyl--. Column 15, line 2, Example 15, "1,3-phenylpyrazolium" should read ---3-phenylpyrazolium---. Column 17, line 32, Claim 18, "and $R_5$ is a" should read --and $R_3$ is a--.

Signed and Sealed this sixteenth Day of December 1975

[SEAL]

Attest:

RUTH C. MASON
Attesting Officer

C. MARSHALL DANN
Commissioner of Patents and Trademarks